United States Patent
Rothrock et al.

(10) Patent No.: US 7,181,603 B2
(45) Date of Patent: Feb. 20, 2007

(54) METHOD OF SECURE FUNCTION LOADING

(75) Inventors: Lewis V. Rothrock, Hillsboro, OR (US); Richard L. Maliszewski, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 1119 days.

(21) Appl. No.: 10/096,685

(22) Filed: Mar. 12, 2002

(65) Prior Publication Data

US 2003/0177371 A1    Sep. 18, 2003

(51) Int. Cl.
*G06F 9/00* (2006.01)

(52) U.S. Cl. .............................. 713/1; 713/2; 713/175; 713/176; 713/187; 713/190; 713/191; 713/193; 713/194; 705/57; 705/58; 726/22; 726/26; 726/30

(58) Field of Classification Search ................. 705/57, 705/58; 713/1, 2, 175, 176, 187, 190, 191, 713/193, 194; 726/22, 26, 30
See application file for complete search history.

(56) References Cited

U.S. PATENT DOCUMENTS

| | | | | |
|---|---|---|---|---|
| 6,157,721 A | * | 12/2000 | Shear et al. | 380/255 |
| 6,757,824 B1 | * | 6/2004 | England | 713/156 |
| 6,874,087 B1 | * | 3/2005 | Fetkovich et al. | 726/23 |

* cited by examiner

Primary Examiner—Emmanuel L. Moise
Assistant Examiner—Paul Callahan
(74) Attorney, Agent, or Firm—Steven P. Skabrat

(57) ABSTRACT

Redirecting function calls through a protected environment to effect secure linkage of program modules. In one embodiment, a program module, such as a player application for example, may make function calls to secure functions instead of to insecure operating system (OS) services, thereby deterring attacks on the player's calls to OS services. In one embodiment, the new secure functions provide similar functionality to the replaced OS services. Providing a securely loaded function for calling by a program module in place of calling an insecure OS function includes obtaining object code for the securely loaded function from a signed binary description file, performing signature and integrity verification of the program module using the signed binary description file, loading the object code for the securely loaded function into memory, and updating an address for calling the securely loaded function by the program module.

27 Claims, 5 Drawing Sheets

METHOD OF SECURE FUNCTION LOADING

BACKGROUND

1. Field

The present invention relates generally to digital content protection in computer and consumer electronics systems and, more specifically, to protecting function calls between program modules.

2. Description

The personal computer (PC) platform is an open and accessible computer architecture. However, the openness of the PC means that it is a fundamentally insecure computing platform. Both the hardware and software can be accessed for observation and modification. This openness allows malicious users and programs to observe and to modify executing code, perhaps with the aid of software tools such as debuggers and system diagnostic tools. Despite these risks, there are classes of operations that must be performed securely on the fundamentally insecure PC platform. These are applications where the basic integrity of the operation must be assumed, or at least verified, to be reliable. Examples of such operations include financial transactions and other electronic commerce, unattended access authorization, and digital content management.

For content providers, countering the threat of digital piracy on the PC requires new software that is resistant to attacks by a malicious user. In this scenario, the malicious user may wish to tamper with or replace particular components of the software in order to gain unauthorized access to digital content or to make unauthorized reproductions. A cryptosystem based on cryptographic methods employed in conjunction with the software may be used to help protect the content owner's rights. Content may be encrypted to provide some measure of protection, but the software accessing the decrypted content during playback is still vulnerable to attack.

Digital content is usually accessed by a player application running on the PC or other electronic device. Players are typically not designed with security in mind. In one example of using the Windows operating system (OS), commercially available from Microsoft Corporation, a player during its operation may make one or more calls to services provided by the OS. A loader function in the OS is used to load the player code into memory, and unresolved references to OS services may be resolved (i.e., bound) at a relatively late stage. Although the integrity of the player may be protected by various known security measures, in some cases the calls that the player makes to OS services may be observed by a malicious user. In fact, these service calls may be susceptible to a "man-in-the-middle" attack.

Although known techniques may generally provide an adequate level of security, improvements can still be made to further secure software and stay one step ahead of digital content pirates. What is needed is a method that will allow a player or other application program on the fundamentally insecure, open PC to call OS services that are very difficult to be observed or modified.

BRIEF DESCRIPTION OF THE DRAWINGS

The features and advantages of the present invention will become apparent from the following detailed description of the present invention in which.

DETAILED DESCRIPTION

Figure 1:
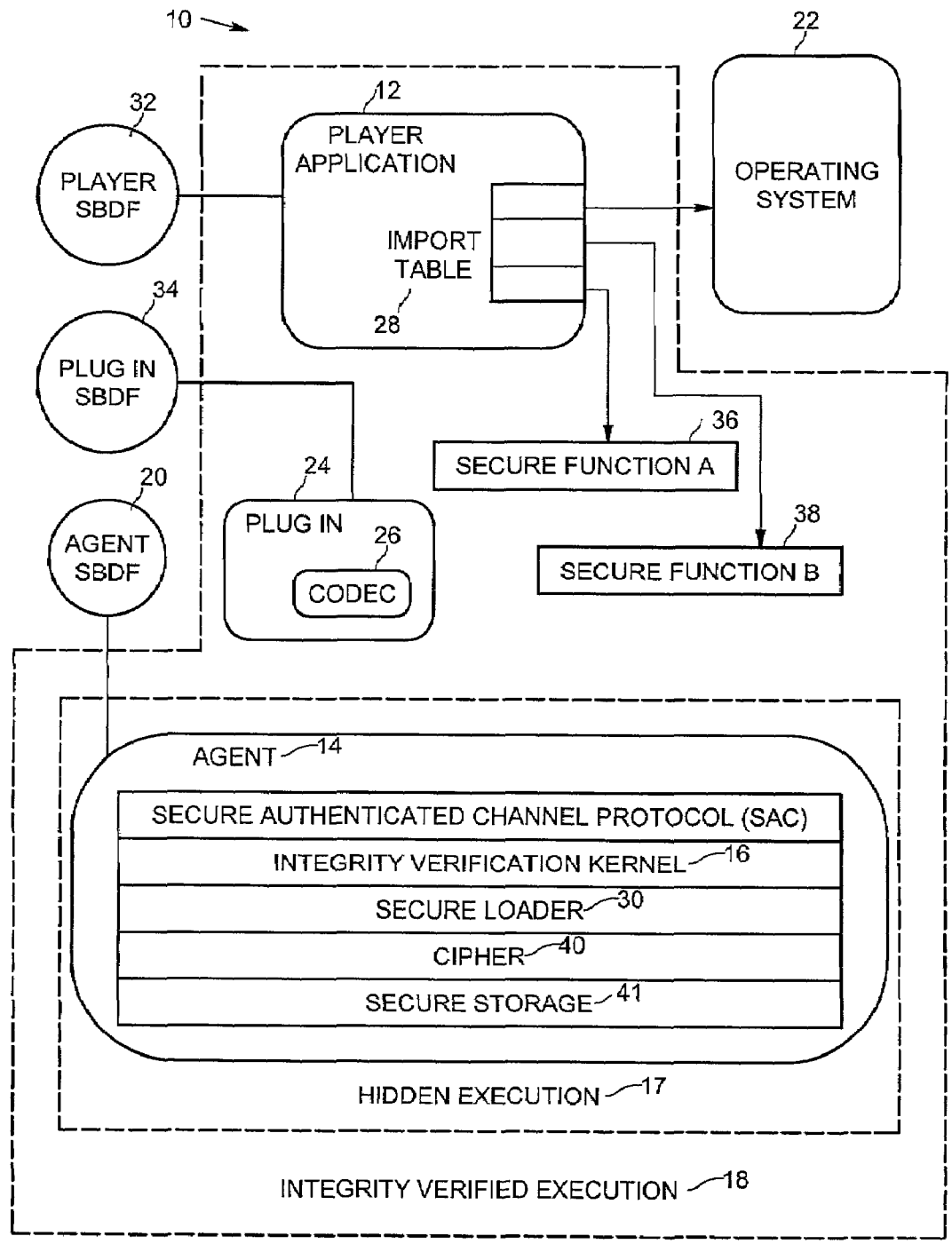
FIG. 1 is a diagram of a secure function system according to an embodiment of the present invention.

An embodiment of the present invention comprises a method for redirecting function calls through a protected environment to effect secure linkage of program modules. In one embodiment, a program module, such as a player application for example, may make function calls to secure functions instead of to insecure OS services, thereby deterring attacks on the player's calls to OS services. In one embodiment, the new secure functions provide similar functionality to the replaced OS services.

Existing processing typically relies on the loader module in the OS to load program code and then to verify that the code has not been tampered with. The loading process is a "hookable" event that hackers may use to leverage further hacking efforts. When the OS loader loads a program module such as a player, the loader resolves previously unresolved references to OS services by the player code by inserting addresses into a data structure called an import table within the program module (e.g., the player). These addresses are the addresses of the OS services in memory. The player makes function calls to the OS services indirectly, using the addresses stored by the OS in the import table. Although the player code image may be hashed to provide some level of security, the player may still be vulnerable to a man-in-the-middle attack on these function calls. Since the import table is filled in by the OS loader at load time, the addresses in the import table cannot be hashed ahead of time by the software developer of the player (i.e., the developer does not know ahead of time where the player will be loaded into memory and what the exact OS service addresses will be). Thus, player calls to the OS services may be captured as events by a hacker ("the man in the middle") to observe the player's behavior in accessing digital content.

In response, embodiments of the present invention use a secure loader module within a tamper-resistant module called an agent. Individual services formerly resident in the OS may be replaced with similar functions loaded out of a signed binary description file (SBDF) after the SBDF and the module(s) the SBDF describes have been verified. Further, the secure loader allows the object code of the secure functions to be encrypted, thereby helping to protect the intellectual property contained therein. Embodiments of the present invention mitigate the problem of an insecure function call to an OS service by applying a trusted "hook" to a replacement function that has been securely loaded.

As used herein, a program module is any identifiable portion of computer program code or any sequence of programming instructions in any programming language. In one embodiment, program modules may comprise at least one of a player application for playing digital content, a plug-in module having a coder/decoder (codec), and an agent for, at least in part, providing security. In other embodiments, a program module may comprise one or more other application programs. Generally, a SBDF may be a file comprising, at least in part, a binary description of the integrity of at least one program module.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

FIG. 1 is a diagram of a secure function system 10 according to an embodiment of the present invention. Known techniques may be used to securely link a first program module called a player application 12 with a second program module, called an agent 14, as described in U.S. Pat. No. 6,105,137 "Method and Apparatus for Integrity Verification, Authentication, and Secure Linkage of Software Modules.". In this example, the player may be an application program to play digital content such as audio, video, still images, music, movies, multimedia, and so on, and the agent may be a software component to provide security services for the player. Player 12 uses a security module within the agent called an Integrity Verification Kernel (IVK) 16, to verify the integrity of the player. In one embodiment, agent 14 may be made tamper resistant to further protect the agent from attempts by malicious users to tamper with or observe its execution and/or its interaction with the player. The use of tamper resistance techniques help to provide a protected environment for operation of the player.

Tamper resistant software is software that has been made resistant to observation and modification. It can be trusted, within certain bounds, to operate as intended even in the presence of a malicious attack on it. Tamper resistant software is position independent and not require relocation in memory. Therefore, tamper resistant software does not have to run in the same address space or processor in which it was created. In one embodiment, such software is generated by using a tamper resistant compiler (not shown). The tamper resistant compiler is a compiler that, when applied to a well prepared software module, replaces the plain-text source code compiler generated image with a new image that is obfuscated. This self-decrypting software will only execute properly if no part of the image has been altered from the time it was compiled by the tamper resistant compiler. The tamper resistant compiler is a software approach towards providing kernels of software (e.g., the agent) with the ability to run in a "hidden" execution mode 17. Attempts to decipher what the software is actually doing, or modifications made to the software, will result in the complete failure of the kernels (i.e., it will not decrypt properly).

Player 12 may be associated with an Integrity Verification Kernel (IVK) 16 within agent 14. An IVK is software that verifies that the "fingerprint" of an in-memory program image (e.g., the code image of the player) corresponds to the data within a supplied digital signature (contained in player SBDF 32). This procedure authenticates the program image. It provides a robust mechanism for detecting changes made to executing software, where those changes might be caused by transmission errors or malicious attacks on the software. Any unauthorized change to the software results in a failure in the verification process. If the verification process fails, then the player may be inhibited from executing. For example, if the program being verified is a digital content player application and the player's integrity is detected by the IVK to be compromised, then the player will not decrypt and play the content. IVKs for tamper resistant software are constructed to perform self-checks of object code, bilateral authentication of partner modules, and checks on local and remote data to verify the integrity of a software module. The IVK is self-modifying, self-decrypting, and may be installation unique.

Two intra-process software modules (e.g., the player and the agent) requiring to communicate with each other in an authenticated manner can establish that the module one is calling is indeed the one it is expecting by verifying the digital signature of the called module using a predetermined "root" key. This process is called bilateral authentication. In embodiments of the present invention, IVK 16 may be used to verify the integrity of the player 12. Detailed methods for creating tamper resistant modules and providing integrity verification processing with IVKs and bilateral authentication are described in U.S. Pat. No. 5,892,899, entitled "Tamper Resistant Methods and Apparatus", which is commonly assigned to the same entity as the present invention.

In embodiments of the present invention, player 12 and agent 14 operate within an environment of "integrity verified execution" 18. By using the techniques described above, the agent may be tamper resistant and the integrity of the player may be continually verified by the agent during player operation.

Processing by the system shown in FIG. 1 may be performed as follows. The OS 22 loads and starts execution of a main application program. In the example shown in FIG. 1, the main application program is a player application for playing and/or downloading music, video, or other multimedia content. At this point, one or more static software modules may be loaded into memory along with the main player executable files to pre-resolve path information of dynamic modules. This may, for example, be achieved on the basis of information in a component database (not shown). In one embodiment, the static components and the main player process provide interfaces to allow a user to interact with the main process. The interaction generally requires the user's identity to be authenticated and the modules related to the main process to be verified and/or linked together in a secure manner. When the user clicks on an action for the player or demands that an action be performed, the player loads specific object modules that allow the action to be performed. The object modules may, for example, be a program module within the player, an agent, a plug-in 24, or other code. In the context of a player, actions that a user may wish to perform may be playing a song, loading a song to a portable device, playing a video, converting digital content to another format, and so on. In the example shown in FIG. 1, performing a requested action may require loading different object modules, such as plug-in 24 and agent 14, for example. In other embodiments, other modules may be invoked in place of or in combination with the modules shown in FIG. 1. Plug-in 24 may be loaded and executed to perform a particular function, such as coding and decoding of data in a codec 26, for example.

After the player and any other required modules are loaded by the OS, the import table 26 has been updated by the OS loader to include addresses of calls to OS services and other support modules used by the player. In one embodiment of the present invention, one or more of these addresses may be updated with different addresses by secure loader module 30. During execution of the player, the secure loader within agent 14 examines one or more of the SBDFs (player SBDF 32, plug-in SBDF 34, and Agent SBDF 20) to obtain edit information for editing the import table 28 addresses. By editing the import table addresses, the player may be amended to call relocatable securely loaded functions instead of insecure OS functions. Two examples of securely loaded functions as shown in FIG. 1 are securely loaded function A 36, and securely loaded function B 38, although these are merely illustrative in nature and embodiments of the present invention may comprise any number of securely loaded functions. The code for the securely loaded functions is stored in the SBDFs and protected from tampering by encryption and tamper resistance techniques.

A module's SBDF provides the information required to verify its integrity. In embodiments of the present invention, secure loading information may be added to a module's SBDF. Note that the entity who "signs" a module, creating the SBDF, is also the entity who specifies how the module will modified by the secure loader. Because this information is in the SBDF, this relation is immutable and cannot be "hacked" unless the hackers are successful in breaking the underlying tamper resistant software technology. Cipher 40 may be used to decrypt encrypted secure functions. The secure loader loads the secure functions into memory from their locations in the SBDFs. Secure storage 41 may be used to store secret information while agent 14 is executing. Secure authenticated channel (SAC) protocol 43 may be used to communicate with other trusted endpoints of a communications path (such as a secure server responsible for serving secure music distributions or a secure hardware player to which a user may download music, for example). The SAC protocol may be used to verify the identity of another communicating module as one that is trusted, and to transmit keys or requests for service.

After the securely loaded functions have been loaded and the import table has been modified to link to the new, securely loaded functions instead of insecure OS functions, when the player calls one of the functions that is now secure, control passes from the player to a selected securely loaded function, rather than to the insecure OS function. Since the securely loaded functions are executing with the integrity verified execution zone 18, any attempts by a hacker to interfere with or observe operation of the player and the securely loaded functions may be detected by IVK 16 within agent 14. When such an attack is detected, operation of the player may be suspended or terminated.

The OS functions to be replaced with securely loaded functions may be carefully chosen to provide increased security. Although OS functions have been discussed herein, other dynamic link library (DLL) calls may also be replaced. For example, library calls to mathematical functions, graphics functions, and so on, may be replaced with securely loaded versions. In one embodiment, OS functions that have been identified as potential security risks may be replaced (such as memory allocation or malloc, for example).

Figure 2:
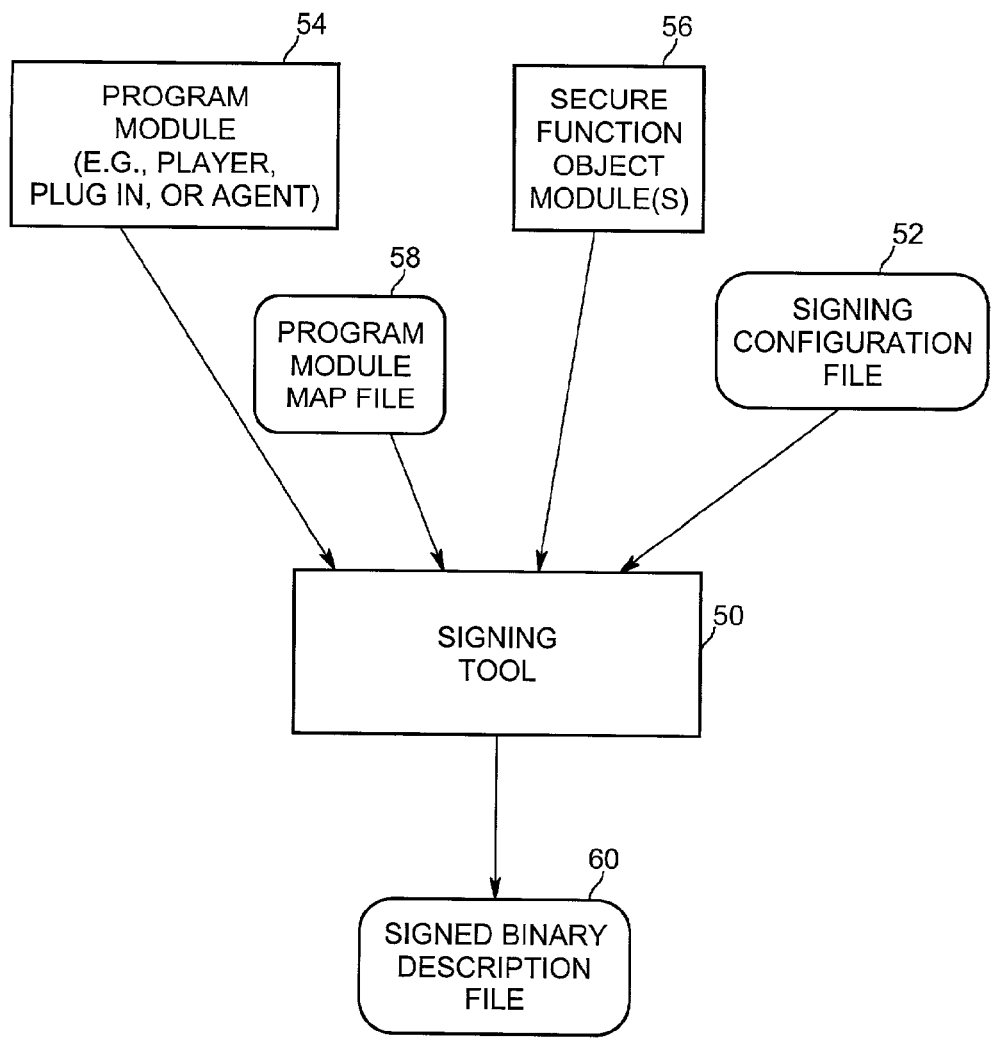
FIG. 2 is a diagram describing input data to and output data from a signing tool according to an embodiment of the present invention.

Each of the program modules shown, player 12, plug-in 24, and agent 14, have an associated signed binary description file (SBDF). A SBDF may be created by a signing tool, which accepts information about a program module (such as player, agent, and plug-in), and identification information from the program module and the IVK, and digitally signs the file. FIG. 2 shows the input data to and output data from a signing tool 50 according to one embodiment of the present invention. One suitable signing tool for this purpose is described in U.S. Pat. No. 6,105,137 entitled "Method and Apparatus for Integrity Verification, Authentication, and Secure Linkage of Software Modules.". In one implementation the signing tool may be a signed binary description file (SBDF) manager program that generates an SBDF. For example, the C programming language may be used to implement the signing tool, with the tool running as one or more executable files or dynamic modules, such as DLL files or shared files. The terminology of the dynamic modules may vary depending on the operating system environment, including, but not limited to, Microsoft Windows, Unix, Linux and Apple Macintosh. In other embodiments, other programming languages, a hardware equivalent, or other formats may be used for implementing the signing tool.

In one embodiment, the signing tool may read a signing configuration file 52 specified in a command line parameter when invoking execution of the signing tool by a software developer or other entity. The signing configuration file comprises information for generating the SBDF, such as which functions to replace, how to replace selected functions, how the modules are to be signed, symbolic addresses for editing the import table, key information for signing and encrypting, and so on. This information may include information such as the number of program modules, unique identification names of program modules, the number of secure function object modules, unique identification names of secure function object modules, file paths to program modules and/or secure function object modules, the type of hash algorithm used, a relocation table, passwords, and other program module information.

Other inputs to the signing tool include zero or more program modules 54, secure function object modules 56, and a program module map file 58. Program modules may be in object code format as output from a compiler. Program modules may be, for example, a player, a plug-in, and an agent. Secure function object modules may be the new replacement functions in object code format. Program module map file may be a file generated when producing an executable file or a dynamic module that lists all functions and variable offsets in the binary. Other information in the map file may include additional compilation data referring to such things as symbols and tables, for example.

The signing tool takes the program modules, secure function object modules, and the program module map file and operates on them according to the instructions contained in the signing configuration file to generate SBDF 60. The SBDF thus contains, at least in part, object code for functions to be securely loaded. The SBDFs may be considered to be a license for the player (when the player application program and associated program modules are built, the SBDF is also built). Hence, a software developer or other development entity sets up the SBDFs for protecting identified functions at design time. Then, at run-time when the player has been loaded and is executing, the player and securely loaded functions may be protected.

Figure 3:
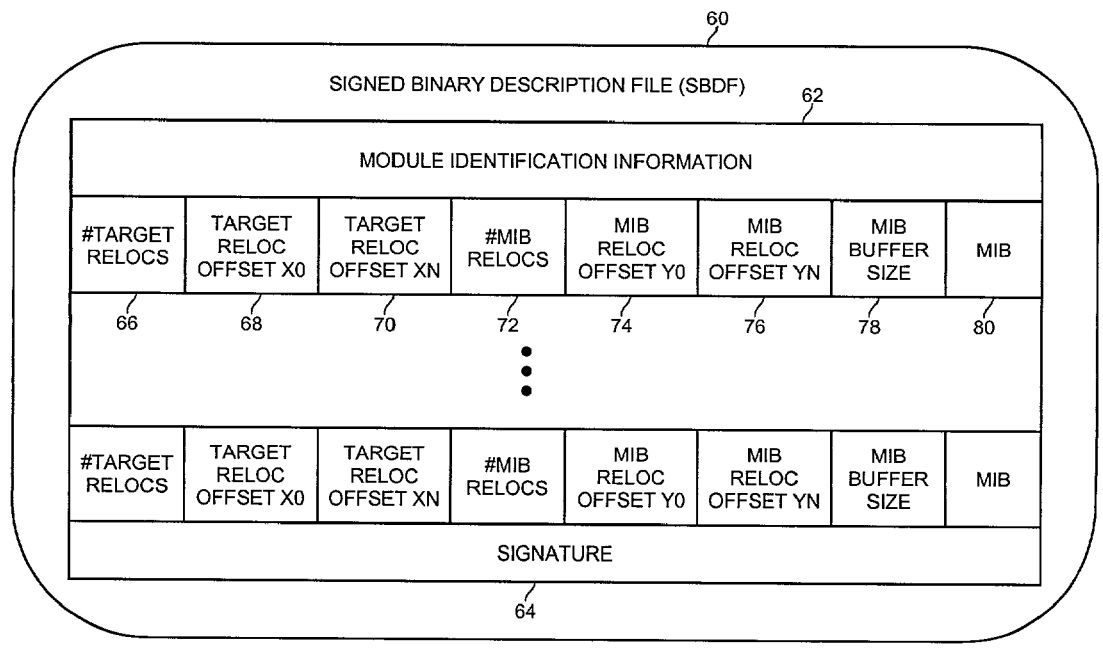
FIG. 3 is a diagram of a signed binary description file (SBDF) according to an embodiment of the present invention.

FIG. 3 is a diagram of a signed binary description file (SBDF) according to an embodiment of the present invention. FIG. 3 shows one embodiment of the format of a SBDF, although in other embodiments, other fields may be added or deleted without limiting the scope of the present invention. Module identification field 62 identifies the program module calling the securely loaded functions described in this SBDF. Signature 64 comprises the digital signature of the contents of the SBDF. For each relocatable securely loaded function, a number of fields as shown in FIG. 3 may be stored in the SBDF. The #Target Relocs field 66 indicates the number of target relocations to be modified in the import table of the player (or other program module). For each target relocation, a target relocation offset field may be included. In the example of FIG. 3, target reloc offset X0 68 and target reloc offset XN 70 fields are shown, indicating a plurality of relocation offset fields 0 through N, where N+1 is the number of target relocations. Each target relocation offset specifies a location in the import table that may be modified. The #MIB Relocs field 72 indicates the number of relocation offsets into the following machine instruction buffer (MIB). This value may be zero or more. A MIB stores object code for the selected securely loaded function. For each MIB relocation, a MIB relocation offset field may be included. In the example of FIG. 3, MIB reloc offset Y0 74 and MIB reloc offset YN field are shown, indicating a plurality of MIB relocation offset fields 0 through N, where N+1 is the number of MIB relocations. Each MIB relocation offset specifies a location within the MIB where code needs to be amended, based on where the code may be loaded. The MIB buffer size field 76 specifies the size in bytes of the securely loaded function object code in the following MIB 78.

Figure 4:
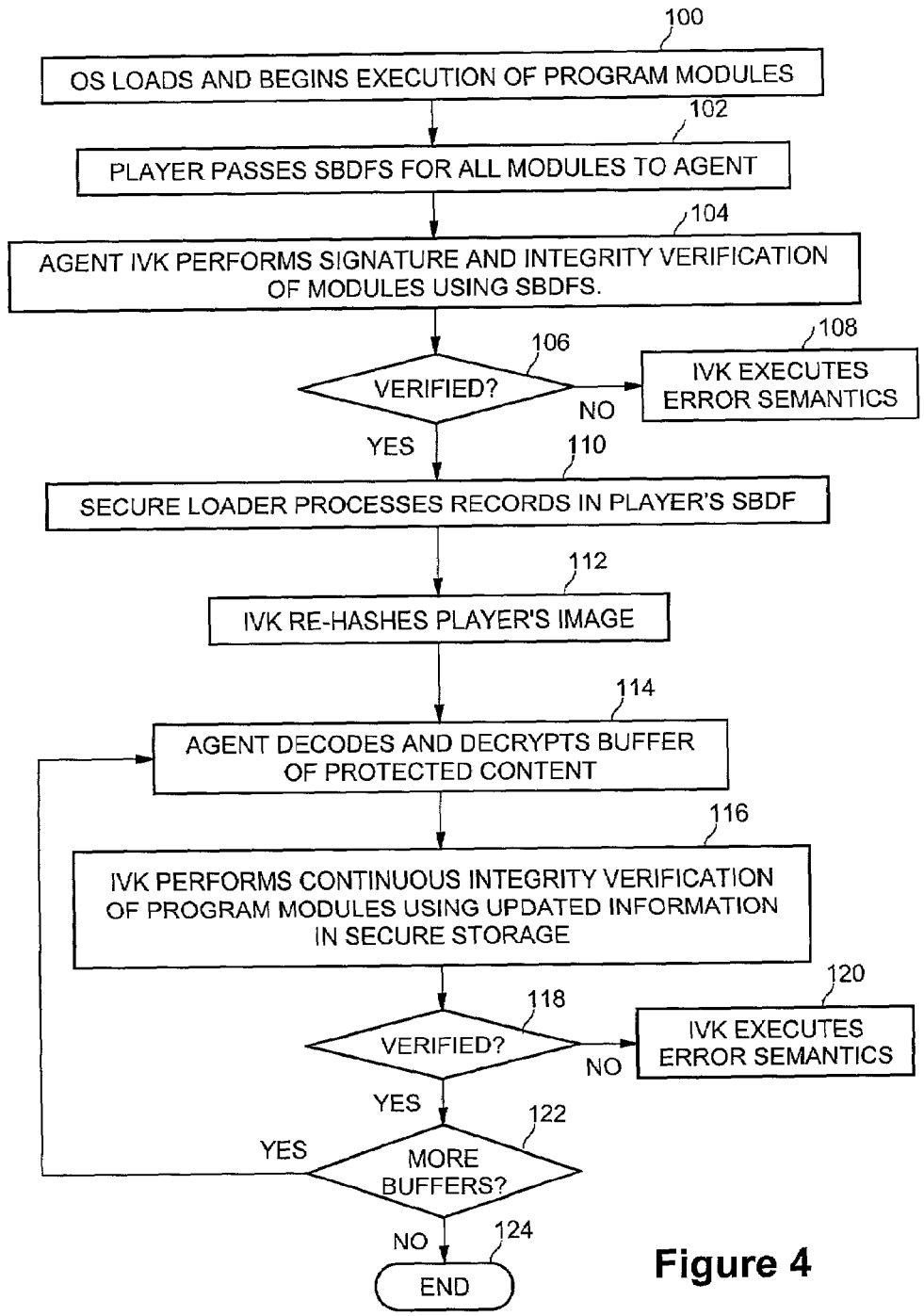
FIG. 4 is a flow diagram of secure function processing according to an embodiment of the present invention.

FIG. 4 is a flow diagram of secure function processing according to an embodiment of the present invention. Once program modules as described above have been signed and distributed along with digital content to a client computer system, the protected playback environment as shown in FIG. 1 may be loaded by the OS. When the user presses the "play" button, for example, to play digital content, the actions of FIG. 4 may be performed. At block 100, the OS loads and begins execution of program modules. For example, the player 12 may be loaded and started, if it is not already executing. Once the player is loaded and started, playing digital content may require use of a plug-in 24 having a codec 26. When the player is executing, agent 14 may also be loaded and executed, in order to provide security for the player and associated modules. The agent may control access to premium digital content. In some cases, some capabilities of the player may available, but before the agent allows access to the content, the modules must first be verified.

At block 102, the player passes SBDFs for the relevant modules (player, plug-in, and agent) to the agent. At block 104, the IVK within the agent performs signature and integrity verification of all modules using the SBDFs received during block 102. The IVK determines if the player, plug-in, and agent are as expected and have not been tampered with. At block 106, the IVK determines if the modules have been verified. If the modules do not verify for any reason, the IVK may execute error semantics at block 108 to handle the error. In some embodiments, processing of the player may then be terminated.

Figure 5:
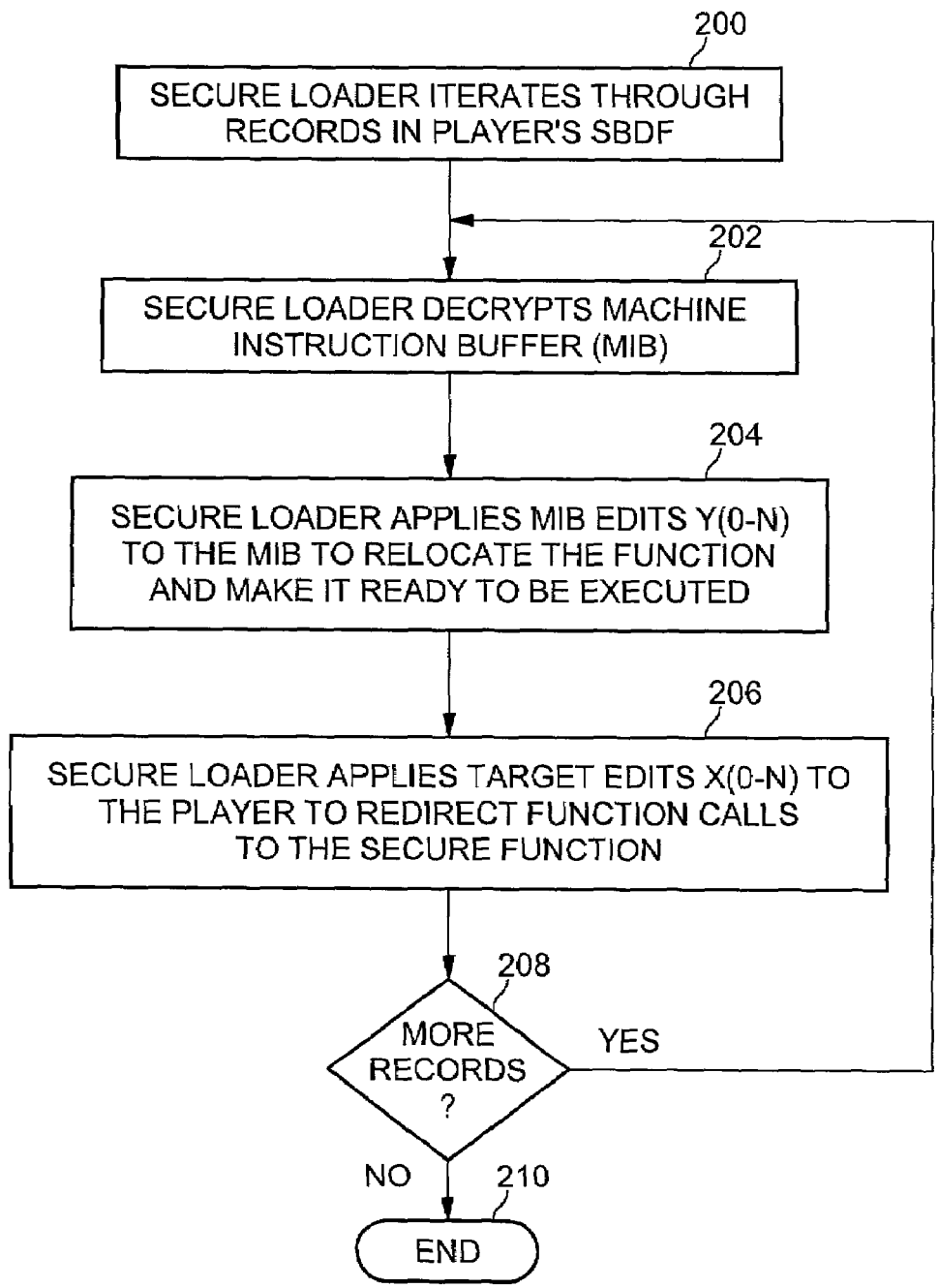
FIG. 5 is a flow diagram of secure loader processing according to an embodiment of the present invention.

If the modules are verified, processing continues with block 110. At block 110, secure loader 30 processes records in the player's SBDF 32. This processing is shown, at least in part, in FIG. 5. At block 200, the secure loader iterates through the records in the player's SBDF 32. There may be one record for each securely loaded function provided in the SBDF. At block 202, the secure loader decrypts the machine instruction buffer (MIB) 80. The secure loader stores the decrypted code image for the selected securely loaded function in a program memory suitable for executable code. Next, at block 204, the secure loader applies MIB edits specified by a plurality of MIB relocation offsets 74, 76 to the decrypted MIB to relocate the selected function and make the function ready to be executed. At block 206, the secure loader applies target edits specified by a plurality of target relocation offsets 68, 70 to selected import table entries within the player to redirect player function calls to the secure function. If more records need to be processed within the player SBDF (e.g., more secure functions need to be set up) at block 208, then processing continues with the next record in the SBDF at block 202. Otherwise, secure loader processing may be complete at block 210. The original information in the SBDF may be discarded upon completion of block 210.

Referring back to FIG. 4, at block 112, the IVK re-hashes the player image, including where the target edits have been applied in the import table. The hash of one or more secure functions may be included in the new image hash. An image map in secure storage 41 may be updated so that continuous verification by the IVK will now verify that the player's import table has not been "hooked" by an attacker. At block 114, the agent may decode and decrypt a buffer of digital content as part of the playing of the content by the player. Securely loaded functions may be called based on the algorithms of the player application. Note that since the securely loaded functions now reside within the security perimeter of integrity verified execution 18, an attacker cannot set a breakpoint using a system debugger tool and stop the system without being detected. At block 116, the IVK performs continuous integrity verification of program modules using the updated hashing information in secure storage 41. At block 118, if the IVK determines that the program modules are not verified, the IVK executes error semantics at block 120. Otherwise, the program modules are verified and processing continues at block 122. At this block, if there are more content buffers to process, processing continues with the next buffer at block 114, while continuous integrity verification also continues. When there are no more content buffers to process, processing ends at block 124.

When providing security components for content protection, security software developers often work with other developers and associated "third party" software "stacks" or applications. With embodiments of the present invention, a security software developer may make the third party software (that has not been designed with security as a priority), more secure be removing the vulnerability of some playback modules to be "hooked" by a hacker. Embodiments of the present invention allow a security software developer to build agents that can be customized by securely loading a function in the "hidden execution" domain.

Embodiments of the present invention allow a player or other program module to avoid having the OS loader load certain functions, thereby improving security. Further, the present invention allows for the case of loading code that is encrypted during distribution, but only decrypted prior to execution in an "integrity verified execution" zone. Since a method of replacing or intercepting calls to the OS is provided, embodiments of the present invention may be used to provide a general secure layer to make insecure applications more secure.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, set-top boxes, personal digital assistants, and similar devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g., compact read only memory (CD-ROM), digital versatile disk (DVD), hard disk, magnetic disk, or similar medium or device, that is readable by a general or special purpose programmable machine for configuring and operating the machine when the storage medium or device is read by the computer to perform the procedures described herein. The system may also be considered to be implemented as a machine-readable storage medium, configured with a program, where the storage medium so configured causes a machine to operate in a specific manner. Other embodiments are within the scope of the following claims.

While the present invention has been described with respect to a limited number of embodiments, those skilled in the art will appreciate numerous modifications and variations. It is intended that the appended claims cover all such modifications and variations as fall within the true spirit and scope of this present invention.

What is claimed is:

1. A method of providing a securely loaded function for calling by a program module in place of calling an operating system function comprising:
    obtaining object code for the securely loaded function from a signed binary description file;
    performing signature and integrity verification of the program module using the signed binary description file;
    loading the object code for the securely loaded function into memory; and
    updating an address for calling the securely loaded function by the program module.

2. The method of claim 1, wherein obtaining the object code for the securely loaded function comprises decrypting the object code stored in the signed binary description file prior to loading the object code.

3. The method of claim 2, further comprising updating the object code according to a plurality of relocation offsets to relocate the securely loaded function.

4. The method of claim 3, further comprising obtaining the relocation offsets from the signed binary description file.

5. The method of claim 2, wherein updating the address for calling the securely loaded function by the program module comprises updating a data structure within the program module by applying target edits specified by a plurality of target relocation offsets to selected elements of the data structure to redirect at least one selected function call by the program module from an operating system function to the securely loaded function.

6. The method of claim 5, further comprising obtaining the target relocation offsets from the signed binary description file.

7. The method of claim 5, further comprising computing a hash value for a code image of the program module after the target edits have been applied.

8. The method of claim 1, wherein the obtaining, performing, loading and updating occur within a hidden execution mode.

9. The method of claim 1, further comprising calling the securely loaded function by the program module, integrity of the securely loaded function and the program module being continuously verified within an integrity verified execution environment.

10. An article comprising: a machine accessible medium having a plurality of machine readable instructions, wherein when the instructions are executed by a processor, the instructions provide for providing a securely loaded function for calling by a program module in place of calling an operating system function by
    obtaining object code for the securely loaded function from a signed binary description file;
    performing signature and integrity verification of the program module using the signed binary description file;
    loading the object code for the securely loaded function into memory; and
    updating an address for calling the securely loaded function by the program module.

11. The article of claim 10, wherein instructions for obtaining the object code for the securely loaded function comprise instructions for decrypting the object code stored In the signed binary description file prior to loading the object code.

12. The article of claim 11, further comprising instructions for updating the object code according to a plurality of relocation offsets to relocate the securely loaded function.

13. The article of claim 12, further comprising instructions for obtaining the relocation offsets from the signed binary description file.

14. The article of claim 11, wherein instructions for updating the address for calling the securely loaded function by the program module comprise instructions for updating a data structure within the program module by applying target edits specified by a plurality of target relocation offsets to selected elements of the data structure to redirect at least one selected function call by the program module from an operating system function to the securely loaded function.

15. The article of claim 14, further comprising instructions for obtaining the target relocation offsets from the signed binary description file.

16. The article of claim 14, further comprising instructions for computing a hash value for a code image of the program module after the target edits have been applied.

17. The article of claim 10, wherein the obtaining, performing, loading and updating occur within a hidden execution mode.

18. The article of claim 10, further comprising instructions for calling the securely loaded function by the program module, integrity of the securely loaded function and the program module being continuously verified within an integrity verified execution environment.

19. A system for providing a securely loaded function comprising:
    a memory to store
        a program module having a data structure storing an address of a call to an operating system function;
        a signed binary description file storing the securely loaded function;
        an agent to continuously verify the integrity of the program module, the agent including a secure loader to obtain the securely loaded function from the signed binary description file, to load the securely loaded function into memory, and to update the address to reference the securely loaded function in place of the operating system function; and
    a processor to execute instructions implementing the program module and agent when the program module and agent are read from the memory.

20. The system of claim 19, wherein the program module and the agent operate within an integrity verified execution environment.

21. The system of claim 19, wherein the agent operates within a hidden execution mode.

22. The system of claim 19, wherein the agent is tamper resistant.

23. The system of claim 19, wherein the data structure comprises an import table storing addresses to functions.

24. The system of claim 19, wherein the program module comprises a player application program to play digital content.

25. The system of claim 19, wherein the securely loaded function stored in the signed binary description file is encrypted and the secure loader decrypts the encrypted function prior to loading.

26. The system of claim 19, wherein the agent performs a hash of a code image of the program module after the address is updated for use in continuous integrity verification of the program module after loading of the function.

27. The system of claim 19, wherein the signed binary description file comprises a plurality of target relocation offsets, a plurality of object code relocation offsets, and object code for the securely loaded function.

* * * * *